US011928968B2

(12) United States Patent
Kim

(10) Patent No.: US 11,928,968 B2
(45) Date of Patent: Mar. 12, 2024

(54) PLATOONING CONTROL APPARATUS BASED ON ACTIVE COLLISION AVOIDANCE CONTROL, A SYSTEM INCLUDING THE SAME, AND A METHOD THEREOF

(71) Applicants: HYUNDAI MOTOR COMPANY, Seoul (KR); KIA CORPORATION, Seoul (KR)

(72) Inventor: Dong Hyuk Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/886,335

(22) Filed: Aug. 11, 2022

(65) Prior Publication Data
US 2022/0383753 A1 Dec. 1, 2022

Related U.S. Application Data

(62) Division of application No. 15/918,568, filed on Mar. 12, 2018, now Pat. No. 11,450,211.

(30) Foreign Application Priority Data

Dec. 12, 2017 (KR) .......................... 10-2017-0170438

(51) Int. Cl.
*G08G 1/00* (2006.01)
*B60W 30/09* (2012.01)
(Continued)

(52) U.S. Cl.
CPC ............... *G08G 1/22* (2013.01); *B60W 30/09* (2013.01); *B60W 30/165* (2013.01);
(Continued)

(58) Field of Classification Search
CPC . B60W 30/09–30/0956; G05D 1/0287; G05D 1/0289
See application file for complete search history.

(56) References Cited

U.S. PATENT DOCUMENTS 10,144,420 B2 12/2018 Yoo et al.
2010/0256852 A1* 10/2010 Mudalige ............... G08G 1/164
701/24

(Continued)

FOREIGN PATENT DOCUMENTS

CN 105654754 A 6/2016
CN 105774800 A 7/2016
(Continued)

OTHER PUBLICATIONS

Office Action cited in Chinese patent application No. 201810300163.X; dated May 27, 2022; 22 pp.
(Continued)

*Primary Examiner* — Jeffrey C Boomer
(74) *Attorney, Agent, or Firm* — Lempia Summerfield Katz LLC

(57) ABSTRACT

A platooning control system is based on active collision avoidance control. The system includes a first platooning control apparatus located in a foremost leading vehicle in a platoon for determining whether it is possible for the leading vehicle to collide when the leading vehicle is fully braked and whether it is possible to avoid collision when it is determined that collision will occur when the leading vehicle is fully braked, calculating a longitudinal deceleration profile and a transverse path of the leading vehicle, and collision with following vehicles that follow the leading vehicle, and transmitting the calculation result to the following vehicles. The system includes a second platooning control apparatus located in a following vehicle for determining whether it is possible for the following vehicle to
(Continued)

avoid collision according to whether, from the first platooning control apparatus, it is possible for the leading vehicle to collide when the leading vehicle is fully braked and whether it is possible to avoid collision when it is determined that collision will occur when the leading vehicle is fully braked, and allowing the following vehicle to follow the leading vehicle or perform collision avoidance control separately from the leading vehicle.

1 Claim, 11 Drawing Sheets

(51) Int. Cl.
*B60W 30/165* (2020.01)
*G08G 1/0967* (2006.01)
*G08G 1/16* (2006.01)

(52) U.S. Cl.
CPC ....... *G08G 1/096725* (2013.01); *G08G 1/161* (2013.01); *G08G 1/162* (2013.01); *G08G 1/166* (2013.01); *G08G 1/167* (2013.01); *B60W 2554/4045* (2020.02)

(56) References Cited

U.S. PATENT DOCUMENTS

| | | |
|---|---|---|
| 2011/0190972 A1 | 8/2011 | Timmons et al. |
| 2014/0316668 A1 | 10/2014 | Akiyama |
| 2015/0154871 A1* | 6/2015 | Rothoff .................. G08G 1/22 701/2 |
| 2017/0011633 A1* | 1/2017 | Boegel ............ B60W 30/18163 |
| 2017/0166204 A1 | 6/2017 | Yoo et al. |
| 2017/0210382 A1 | 7/2017 | Nishimura et al. |
| 2018/0056998 A1* | 3/2018 | Benosman ............ B60W 30/09 |
| 2018/0114439 A1* | 4/2018 | Graves ............... G08G 1/09675 |
| 2018/0137763 A1* | 5/2018 | Deragården ......... G05D 1/0278 |
| 2018/0144640 A1* | 5/2018 | Price ......................... G05D 1/02 |
| 2018/0188725 A1* | 7/2018 | Cremona ............. G05D 1/0295 |
| 2018/0253976 A1* | 9/2018 | Inam ......................... G08G 1/22 |
| 2018/0374366 A1* | 12/2018 | Reimann ............... B60T 8/1701 |
| 2019/0206260 A1* | 7/2019 | Pilkington ............... H04N 5/33 |
| 2020/0148229 A1* | 5/2020 | Meyer ....................... B60T 7/12 |
| 2020/0369269 A1* | 11/2020 | Tanaka ............. G08G 1/096791 |

FOREIGN PATENT DOCUMENTS

| | | |
|---|---|---|
| CN | 107031619 A | 8/2017 |
| JP | 2002266672 | 9/2002 |
| JP | 2009537367 A | 10/2009 |
| JP | 2012068966 A | 4/2012 |
| WO | 2015047181 A1 | 4/2015 |
| WO | 2019110736 A1 | 6/2019 |

OTHER PUBLICATIONS

Office Action cited in corresponding Korean patent application No. 10-2017-0170438; dated Jan. 17, 2022; 20 pp.

* cited by examiner

PLATOONING CONTROL APPARATUS BASED ON ACTIVE COLLISION AVOIDANCE CONTROL, A SYSTEM INCLUDING THE SAME, AND A METHOD THEREOF

CROSS-REFERENCE TO RELATED APPLICATION

This application is a divisional of U.S. application Ser. No. 15/918,568 filed Mar. 12, 2018, which claims priority under 35 U.S.C. § 119 to Korean Patent Application No. 10-2017-0170438, filed on Dec. 12, 2017, in the Korean Intellectual Property Office, the disclosures of which are incorporated herein in their entirety by reference.

TECHNICAL FIELD

The present disclosure relates to a platooning control apparatus based on active collision avoidance control, a system including the same, and a method thereof. More particularly, the present disclosure relates to a technology of actively performing collision avoidance control.

BACKGROUND

Platooning refers to two or more vehicles that can travel closely together. Each vehicle communicates with the other vehicles in the platoon. There is a leading vehicle that controls the speed and direction. All following vehicles respond to the leading vehicle's movement. The platooning vehicles transmit and receive various travel information through vehicle-to-vehicle (V2V) communication to control the speeds of the vehicles and the inter-vehicle intervals. This allows the vehicles to travel while maintaining a specific interval.

If the leading vehicle detects an obstacle in a current lane during platooning, a collision of the platooning vehicles with the obstacle is avoided by providing a collision avoidance measure and transmitting a request from the leading vehicle to control the steering and braking of the following vehicles in the platoon.

However, the current technology cannot properly cope when a situation arises in which real time variations in transverse conditions exist. The characteristics in which the transverse conditions take place are generally not taken into consideration by the current technology. For example, a following vehicle operates according to a control command of a leading vehicle. Undesired situations might take place if an obstacle moves before a collision avoidance measure of the leading vehicle is delivered to the following vehicle.

SUMMARY

The present disclosure is directed to solving the above-described problems of the related art. The present disclosure provides a platooning control apparatus based on active collision avoidance control that actively performs collision avoidance control. The collision avoidance control may be configured to allow a following vehicle to perform independent transverse control to avoid a collision of a host vehicle when the leading vehicle is fully braked. The collision avoidance control may also be configured to determine whether longitudinal collision may be avoided in the case of an emergent situation during platooning. It is also an aspect of the present disclosure to provide a system including the same, and a method thereof.

The technical objects of the present disclosure are not limited to the above-mentioned ones. The other unmentioned technical objects will become apparent to those of ordinary skill in the art from the following description.

In accordance with an aspect of the present disclosure, a platooning control apparatus includes a collision avoidance determining unit configured to, when a host vehicle is one of one or more following vehicles while a leading vehicle and the following vehicles platoon, determine whether it is possible to avoid collision of the host vehicle according to whether the host vehicle collides with a front vehicle. The front vehicle may be the leading vehicle or another following vehicle. The collision avoidance determining unit is also configured to determine whether longitudinal collision of the host vehicle is avoided when the leading vehicle is fully longitudinally braked. The platooning control apparatus also includes a collision avoidance path generating unit configured to generate a collision avoidance path when it is possible to avoid collision of the host vehicle. The platooning control apparatus further includes a collision avoidance controller configured to control the host vehicle to travel on the collision avoidance path.

According to an embodiment, when it is possible for the host vehicle to collide with a front vehicle when the leading vehicle is fully braked longitudinally, the collision avoidance controller may control the host vehicle to be fully braked longitudinally. Additionally, the collision avoidance determining unit may determine whether it is possible to avoid collision of the host vehicle.

According to an embodiment, the collision avoidance determining unit may determine whether the number of collision avoidance paths is larger than 1 when it is possible for the host vehicle to collide with the front vehicle and collision avoidance control of the leading vehicle is possible when the leading vehicle is fully braked longitudinally, and may determine whether the leading vehicle is continuously braked after the collision avoidance control of the leading vehicle when the number of the collision avoidance paths is larger than 1.

According to an embodiment, the collision avoidance determining unit may perform avoidance control such that the host vehicle changes a lane to a path that is opposite to a direction to which a lane of the leading vehicle has been changed through the collision avoidance control when the leading vehicle is continuously braked after the collision avoidance control of the leading vehicle. Additionally, the collision avoidance determining unit may perform avoidance control such that the host vehicle changes a lane to a path that corresponds to the direction to which the lane of the leading vehicle has been changed through the collision avoidance control when the leading vehicle is not continuously braked after the collision avoidance control of the leading vehicle.

According to an embodiment, the collision avoidance determining unit may perform avoidance control such that the host vehicle changes a lane to a left passing lane, among one or more collision avoidance paths, when it is possible for the host vehicle to collide with the front vehicle when the leading vehicle is fully braked longitudinally.

According to an embodiment, when it is impossible for the host vehicle to collide with a front vehicle when the leading vehicle is fully braked longitudinally, the collision avoidance controller may perform the same longitudinal control as the leading vehicle. The collision avoidance determining unit may also determine whether it is possible to avoid collision of the host vehicle.

According to an embodiment, the collision avoidance determining unit may determine whether the number of collision avoidance paths is larger than 1 when it is impossible for the host vehicle to collide with the front vehicle and collision avoidance control of the leading vehicle is possible when the leading vehicle is fully braked longitudinally. The collision avoidance determining unit may also determine whether the leading vehicle is continuously braked after the collision avoidance control of the leading vehicle when the number of the collision avoidance paths is larger than 1.

According to an embodiment, the collision avoidance determining unit may perform avoidance control such that the host vehicle changes a lane to a path that is opposite to a direction to which a lane of the leading vehicle has been changed through the collision avoidance control when the leading vehicle is continuously braked after the collision avoidance control of the leading vehicle. The collision avoidance determining unit may also perform avoidance control such that the host vehicle changes a lane to a path that corresponds to the direction to which the lane of the leading vehicle has been changed through the collision avoidance control when the leading vehicle is not continuously braked after the collision avoidance control of the leading vehicle.

According to an embodiment, the collision avoidance determining unit may perform avoidance control such that the host vehicle changes a lane to a left passing lane, among one or more collision avoidance paths, when it is impossible for the host vehicle to collide with the front vehicle when the leading vehicle is fully braked longitudinally.

According to an embodiment, the collision avoidance determining unit may determine whether it is possible to avoid collision of the host vehicle by using a longitudinal deceleration profile of the leading vehicle received from the leading vehicle and a transverse path of the leading vehicle.

In accordance with another aspect of the present disclosure, a platooning control apparatus includes a collision danger determining unit configured to, when a host vehicle is a leading vehicle while the leading vehicle and one or more following vehicles platoon, determine a danger of collision of the host vehicle with a front vehicle. Additionally, the collision danger determining unit is configured to determine whether it is possible for the host vehicle to collide when the host vehicle is fully braked when there is a danger of collision of the host vehicle. The collision danger determining unit is further configured to determine whether the one or more following vehicles in a platoon collide. The platooning control apparatus also includes a collision avoidance determining unit configured to determine whether it is possible to avoid collision of the host vehicle. The platooning control apparatus further includes a longitudinal deceleration profile generating unit configured to generate a longitudinal deceleration profile of the host vehicle. The platooning control apparatus also includes a collision avoidance path generating unit configured to generate a transverse path for avoiding collision of the host vehicle.

According to an embodiment, the collision avoidance determining unit may determine whether it is possible to avoid collision of the host vehicle regardless of whether it is possible for the host vehicle to collide when the host vehicle is fully braked.

In accordance with another aspect of the present disclosure, a platooning control system includes a first platooning control apparatus located in a foremost leading vehicle in a platoon during platooning. The first platooning control is configured to determine whether it is possible for the leading vehicle to collide when the leading vehicle is fully braked and whether it is possible to avoid collision when it is determined that collision will occur when the leading vehicle is fully braked. Additionally, the first platooning control is configured to calculate a longitudinal deceleration profile of the leading vehicle, a transverse path of the leading vehicle, and collision with following vehicles that follow the leading vehicle in the platoon and transmit the calculation result to the following vehicles. The platooning control system further includes a second platooning control apparatus located in a following vehicle in the platoon. The second platooning control is configured to determine whether it is possible for the following vehicle to avoid collision according to whether it is possible for the leading vehicle to collide when the leading vehicle is fully braked and whether it is possible to avoid collision when it is determined that collision will occur when the leading vehicle is fully braked, which are received from the first platooning control apparatus. The second platooning control is also configured to allow the following vehicle to follow the leading vehicle or perform collision avoidance control separately from the leading vehicle.

In accordance with another aspect of the present disclosure, a method for controlling platooning includes, when a host vehicle is one of one or more following vehicles while a leading vehicle and the following vehicles platoon, determining whether a collision of the host vehicle is avoided according to whether the host vehicle collides with a front vehicle, which is the leading vehicle or another following vehicle, and whether longitudinal collision of the host vehicle is avoided when the leading vehicle is fully longitudinally braked. The method for controlling platooning further includes generating a collision avoidance path when it is possible to avoid collision of the host vehicle. The method for controlling platooning also includes performing a control such that the host vehicle travels on the collision avoidance path.

According to an embodiment, the method may further include, when it is possible for the host vehicle to collide with a front vehicle when the leading vehicle is fully braked longitudinally, performing a control to fully brake longitudinally.

According to an embodiment, the determining of whether it is possible for the host vehicle to avoid collision may include determining whether the number of collision avoidance paths is larger than 1 when it is possible for the host vehicle to collide the front vehicle and collision avoidance control of the leading vehicle is possible when the leading vehicle is fully braked longitudinally. The determining of whether it is possible for the host vehicle to avoid collision may further include determining whether the leading vehicle is continuously braked after the collision avoidance control of the leading vehicle when the number of the collision avoidance paths is larger than 1.

According to an embodiment, the determining of whether it is possible for the host vehicle to avoid collision may further include, when the leading vehicle is continuously braked after collision avoidance control of the leading vehicle, performing avoidance control such that the host vehicle changes a lane to a path that is opposite to a direction to which the lane of the leading vehicle has been changed through the collision avoidance control. The determining of whether it is possible for the host vehicle to avoid collision may further include, when the leading vehicle is not continuously braked after the collision avoidance control of the leading vehicle, performing avoidance control such that the host vehicle changes a lane to a path that corresponds to the direction to which the lane of the leading vehicle has been changed through the collision avoidance control.

According to an embodiment, the performing of the control such that the host vehicle travels may include performing avoidance control such that the host vehicle changes a lane to a left passing lane, among one or more collision avoidance paths, when it is possible for the host vehicle to collide with the front vehicle when the leading vehicle is fully braked longitudinally.

According to an embodiment, the method further includes, when it is impossible for the host vehicle to collide with a front vehicle when the leading vehicle is fully braked longitudinally, performing the same longitudinal control as the leading vehicle.

According to an embodiment, the determining of whether it is possible for the host vehicle to avoid collision may further include determining whether the number of collision avoidance paths is larger than 1 when it is impossible for the host vehicle to collide the front vehicle and collision avoidance control of the leading vehicle is possible when the leading vehicle is fully braked longitudinally. Additionally, the determining of whether it is possible for the host vehicle to avoid collision may include determining whether the leading vehicle is continuously braked after the collision avoidance control of the leading vehicle when the number of the collision avoidance paths is larger than 1.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
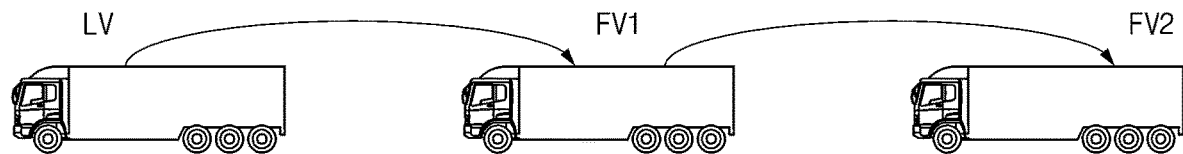
FIG. 1 is a diagram of platooning according to an embodiment of the present disclosure.

Hereinafter, embodiments of the present disclosure are described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those of ordinary skill in the art. The terms defined in the generally used dictionaries should be construed as having the meanings that coincide with the meanings of the contexts of the related technologies. These terms should not be construed as ideal or excessively formal meanings unless clearly defined in the specification of the present disclosure.

The present disclosure discloses a configuration of allowing a following vehicle to perform active collision avoidance control independently and regardless of the collision avoidance control of the leading vehicle. This configuration is arranged according to whether a host vehicle collides with a front vehicle. Additionally, this configuration is arranged according to whether longitudinal collision may be avoided if a danger of collision during platooning is determined with a preceding vehicle (front vehicle) on the front side, a leading vehicle and a plurality of following vehicles forming a platoon.

Hereinafter, embodiments of the present disclosure will be described in detail with reference to FIGS. 1 to 11.

Figure 2:
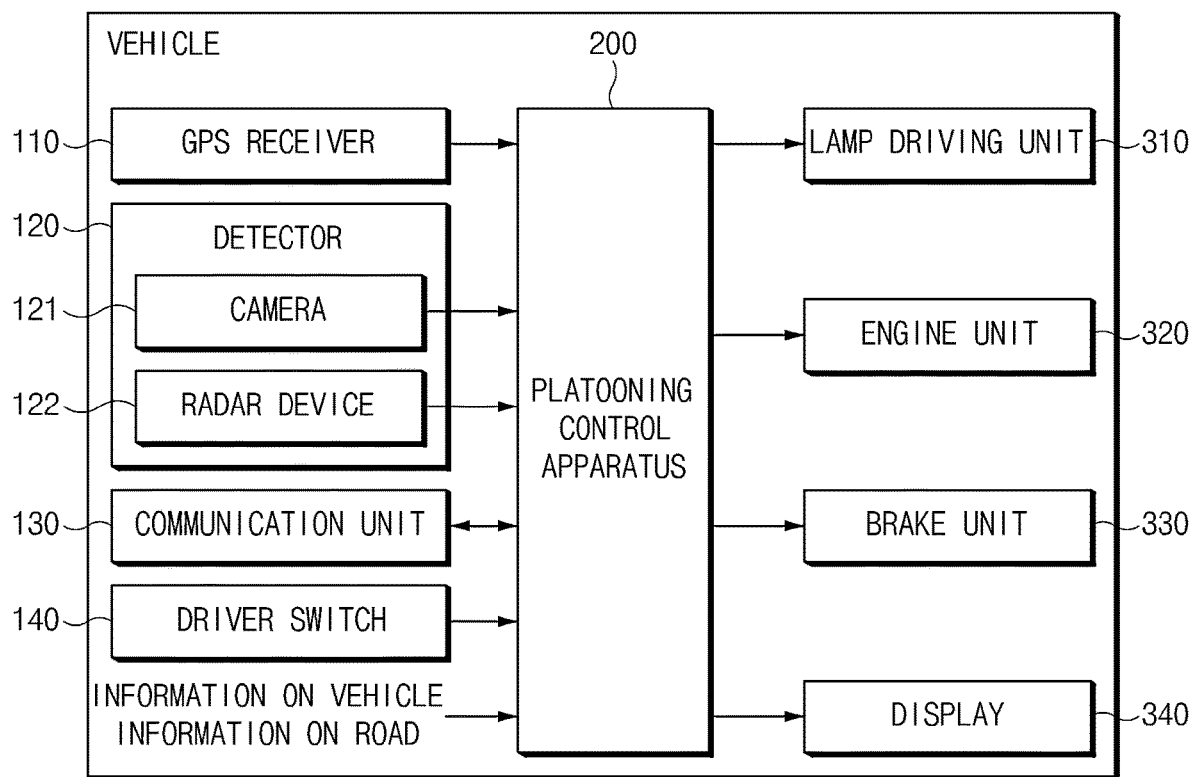
FIG. 2 is a block diagram of a system for controlling platooning according to an embodiment of the present disclosure.
Figure 3:
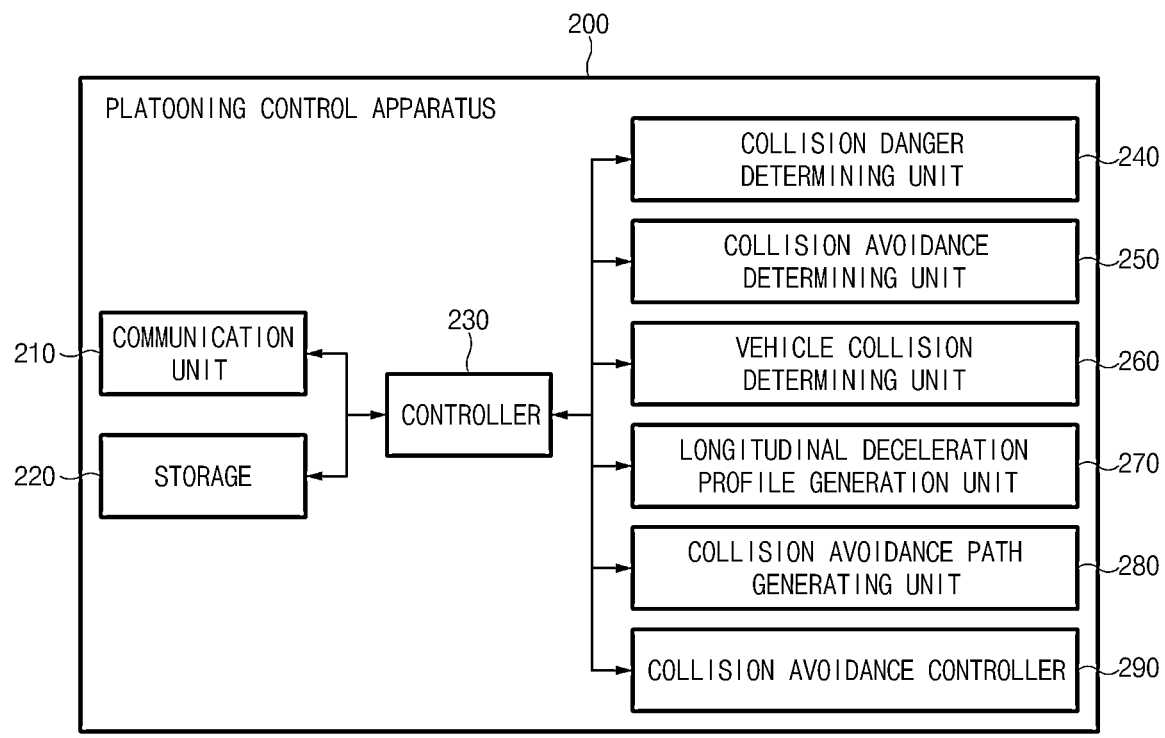
FIG. 3 is a block diagram of a platooning control apparatus according to an embodiment of the present disclosure.
Figure 4:
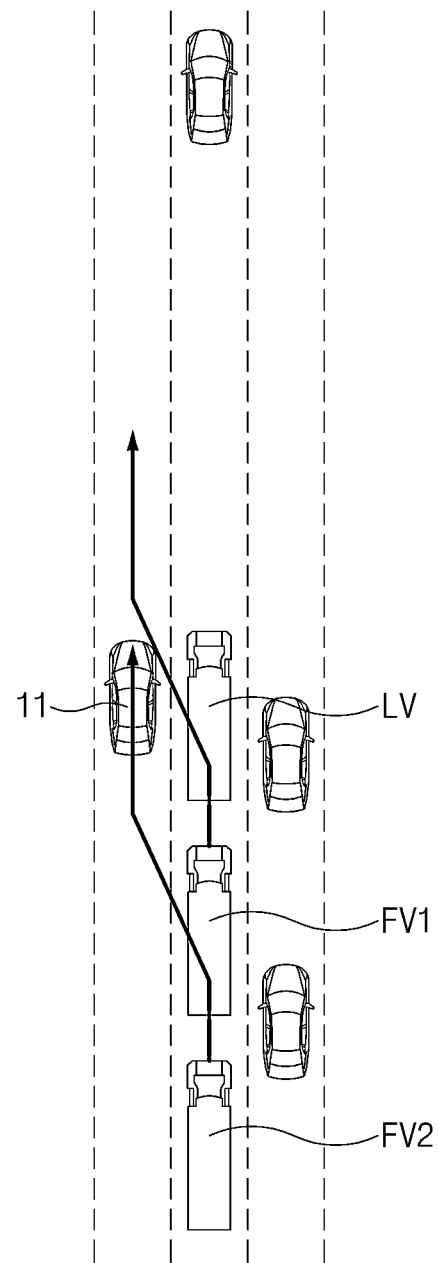
FIG. 4 is a view illustrating that collision of a leading vehicle cannot be avoided according to an embodiment of the present disclosure.
Figure 5:
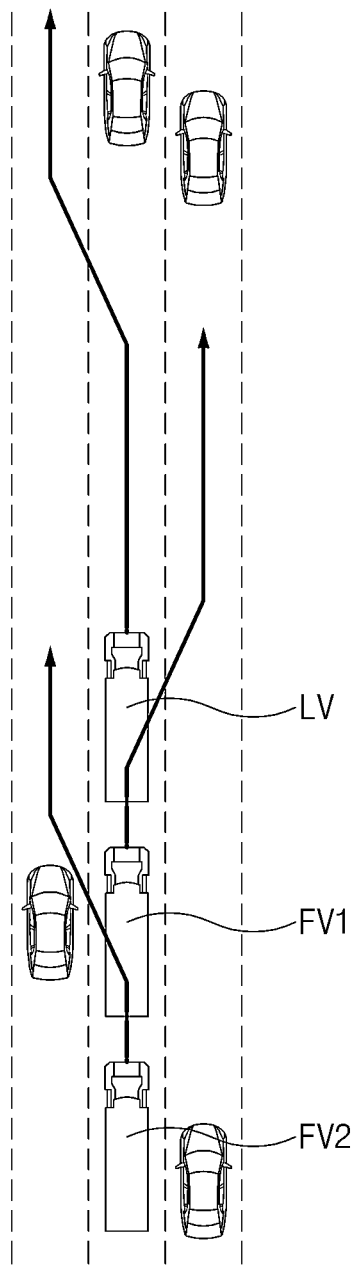
FIG. 5 is a view illustrating that collision of a leading vehicle may be avoided according to an embodiment of the present disclosure.

FIG. 1 is a diagram of platooning according to an embodiment of the present disclosure. FIG. 2 is a block diagram of a system for controlling platooning according to an embodiment of the present disclosure. FIG. 3 is a block diagram of a platooning control apparatus according to an embodiment of the present disclosure. FIG. 4 is a view illustrating that a collision of a leading vehicle cannot be avoided according to an embodiment of the present disclosure. FIG. 5 is a view illustrating that a collision of a leading vehicle may be avoided according to an embodiment of the present disclosure.

Referring to FIG. 1, the driving of a plurality of vehicles while the vehicles form a platoon at a specific interval is called platooning. The vehicle that travels on the foremost side is called a leading vehicle (LV). The vehicles that follow the leading vehicle are called following vehicles (FVs).

Referring to FIG. 2, a platooning control system according to an embodiment of the present disclosure may include a GPS receiver 110, a detector 120, a communication unit 130, a driver switch 140, a platooning control apparatus 200, a lamp driving unit 310, an engine unit 320, a brake unit 330, and a display 340.

The GPS receiver 110 may receive GPS information and provide the received GPS information to the platooning control apparatus 200 such that the platooning control apparatus 200 may recognize a location of a host vehicle.

The detector 120 may detect a location of a remote vehicle, a speed of the remote vehicle, information on the lanes around a host vehicle and a space in which the lanes may be changed and provide them to the platooning control apparatus 200. The detector 120 may include a camera 121 and a radar device 122.

The communication unit 130 may perform vehicle-to-vehicle (V2V) communication. In the present disclosure, the communication unit 130 performs vehicle-to-vehicle communication in a platoon. The communication unit 130 of the leading vehicle transmits information on a collision of the following vehicles, a longitudinal deceleration profile of the leading vehicle, and a transverse path of the leading vehicle to the following vehicles.

The driver switch 140 is switched on and off by the driver to inform a request for platooning or approval of platooning. If a request for platooning related agreement is received, such as a level of platooning or a platooning sequence, from a leading vehicle, the driver may switch on or off the driver switch 140 to provide an opinion. If the driver switch 140 is switched on, it may be determined that the platooning is approved. Further, the vehicle load box related information and map and traffic situation information may be input to the platooning control apparatus 200.

The lamp driving unit 310 operates a vehicle lamp if a command is received from the platooning control apparatus 200 for operating a lamp for controlling platooning. In other words, the lamp driving unit 310 may actuate the lamp to provide a turn signal, a stop signal, a platooning mode signal, and the like.

The engine unit 320 accelerates the vehicle if receiving a command for acceleration from the platooning control apparatus 200.

The brake unit 330 decelerates the vehicle if receiving a command for deceleration from the platooning control apparatus 200.

The display 340 may display platooning situation information, such as whether a platoon is formed, information on a leading vehicle, and information on inter-vehicle distances. The display 340 may include a cluster, a head-up display, a navigation terminal, and an audio, video, and navigation (AVN) device. Although FIG. 2 illustrates a configuration of displaying platooning situation information on the display 340 that is configured separately from the platooning control apparatus 200 as an example, the present disclosure is not limited thereto but a display provided in the platooning control apparatus 200 may display platooning situation information. The display 340 may include at least one of a liquid crystal display (LCD), a thin film transistor (TFT) LCD, a light emitting diode (LED), an organic LED, an active matrix OLED (AMOLED), a flexible display, a bended display, and a 3D display. Among them, some displays may be realized by transparent displays that are configured in a transparent or light-transmitting way such that the outside is visible.

When the host vehicle is the leading vehicle, the platooning control apparatus 200 determines whether a host vehicle may collide with a front vehicle and whether the collision may be avoided when determining that collision will occur when the leading vehicle is fully braked. Additionally, the platooning control apparatus 200 calculates a longitudinal deceleration profile of the leading vehicle, a transverse path of the host vehicle, and a collision with the following vehicles that follow the leading vehicle in the platoon and transmits them to the following vehicles.

When the host vehicle is a following vehicle, the platooning control apparatus 200 determines whether a collision may occur when the leading vehicle and whether the collision of the following vehicle of the host vehicle may be avoided accordingly. The platooning control apparatus 200 may then perform collision avoidance control.

Referring to FIG. 3, the platooning control apparatus 200 includes a communication unit 210, a storage 220, a controller 230, a collision danger determining unit 240, a collision avoidance determining unit 250, a following vehicle collision determining unit 260, a longitudinal deceleration profile generating unit 270, a collision avoidance path generating unit 280, and a collision avoidance controller 290.

The communication unit 210 performs Controller Area Network (CAN) communication with a vehicle device.

The storage 220 stores information received through vehicle-to-vehicle communication, information calculated by the platooning control apparatus 200, and the like. The storage 220 may include a memory, such as a flash memory type, a hard disk type, a micro type, or a card type (for example, a secure digital (SD) card or an eXtream Digital (XD) card), and a storage medium of at least one of memories, such as a random access memory (RAM), a static RAM (SRM), a read-only memory (ROM), a programmable ROM (PROM), an electrically erasable PROM (EEPROM), a magnetic RAM (MRAM), a magnetic disk, and an optical disk.

The controller 230 may control overall operations of the elements of the platooning control apparatus 200.

When the host vehicle is the leading vehicle, the collision danger determining unit 240 determines a danger of a collision with a front vehicle of the host vehicle that is the leading vehicle, determines whether collision may occur during full braking if there is a danger of collision of the host vehicle that is the leading vehicle, and determines whether at least one following vehicle in the platoon collides.

When the host vehicle is a following vehicle, the collision danger determining unit 240 determines whether the collision of the host vehicle that is a following vehicle may be avoided according to whether the host vehicle will collide and whether the longitudinal collision of the host vehicle may be avoided when the leading vehicle is fully longitudinally braked.

When the host vehicle is a leading vehicle, the collision avoidance determining unit 250 determines whether collision of the host vehicle that is a leading vehicle may be avoided regardless of whether collision of the host vehicle may occur when the host vehicle is fully braked.

When the host vehicle is a following vehicle, the collision avoidance determining unit 250 determines whether the number of collision avoidance paths is larger than 1 when the collision of the front vehicle may occur and the collision avoidance control of the leading vehicle may be made. The collision avoidance determining unit 250 then determines whether the leading vehicle is continuously braked after the collision avoidance control of the leading vehicle if the number of the collision avoidance paths is larger than 1. In other words, the collision avoidance determining unit 250 determines whether the leading vehicle is braked to avoid collision with a front vehicle located on the front side of the changed lane even after the lane was changed such that the leading vehicle avoids collision. Then, the collision avoidance determining unit 250 may determine whether the leading vehicle is continuously braked after the collision avoidance control of the leading vehicle by using a deceleration profile of the leading vehicle received from the leading vehicle. The collision avoidance determining unit 250 performs avoidance control such that the host vehicle changes a lane to a path that is opposite to a direction to which a lane of the leading vehicle has been changed through the collision avoidance control when the leading vehicle is continuously braked after the collision avoidance control of the leading vehicle. The collision avoidance determining unit 250 then performs avoidance control such that the host vehicle changes a lane to a path that corresponds to the direction to which the lane of the leading vehicle has been changed through the collision avoidance control when the leading vehicle is not continuously braked after the collision avoidance control of the leading vehicle. FIG. 5 illustrates a case in which opposite side lanes of a leading vehicle are empty so that avoidance control is possible.

When the host vehicle is a following vehicle, the collision avoidance determining unit 250 performs avoidance control such that the host vehicle changes a lane to a left passing lane, among one or more collision avoidance paths, when it is possible for the host vehicle to collide with the front vehicle when the leading vehicle is fully braked longitudinally. FIG. 4 is a view of a case in which vehicles 11 are present on both side lanes of a leading vehicle so that avoidance is impossible.

When the host vehicle is a following vehicle, the collision avoidance determining unit 250 determines whether the number of collision avoidance paths is larger than 1 when it is impossible for the host vehicle to collide with the front vehicle and collision avoidance control of the leading vehicle is possible when the leading vehicle is fully braked longitudinally. The collision avoidance determining unit 250 then determines whether the leading vehicle is continuously braked after the collision avoidance control of the leading vehicle when the number of the collision avoidance paths is larger than 1. The collision avoidance determining unit 250 performs avoidance control such that the host vehicle changes a lane to a path that is opposite to a direction to which a lane of the leading vehicle has been changed through the collision avoidance control when the leading vehicle is continuously braked after the collision avoidance control of the leading vehicle. The collision avoidance determining unit 250 then performs avoidance control such that the host vehicle changes a lane to a path that corresponds to the direction to which the lane of the leading vehicle has been changed through the collision avoidance control when the leading vehicle is not continuously braked after the collision avoidance control of the leading vehicle.

When the host vehicle is a following vehicle, the collision avoidance determining unit 250 performs avoidance control such that the host vehicle changes a lane to a left passing lane, among one or more collision avoidance paths, when it is impossible for the host vehicle to collide with the front vehicle when the leading vehicle is fully braked longitudinally. Then, the collision avoidance determining unit 250 may determine whether it is possible to avoid collision of the host vehicle by using a longitudinal deceleration profile of the leading vehicle received from the leading vehicle and a transverse path of the leading vehicle.

When the host vehicle is a leading vehicle, the following vehicle collision determining unit 260 determines a possibility of collision of a following vehicle that follows the leading vehicle.

When the host vehicle is a leading vehicle, the longitudinal deceleration profile generating unit 270 generates a longitudinal deceleration profile for avoiding collision of the leading vehicle. The longitudinal deceleration profile includes vehicle speed information on a path for platooning. Accordingly, speed information or braking after the lane of the leading vehicle is changed through the avoidance control may be identified through the longitudinal deceleration profile.

The collision avoidance path generating unit 280 generates a collision avoidance path for avoidance of collision when the host vehicle is a leading vehicle. Then, the collision avoidance path is a transverse path, and includes information for changing a lane by the leading vehicle for avoidance control.

When it is possible for the host vehicle, which is a following vehicle, to collide with a front vehicle when the leading vehicle is fully braked longitudinally, the collision avoidance control unit 290 performs a control such that the host vehicle that is a following vehicle to travel to a collision avoidance path after the host vehicle that is a following vehicle is fully braked longitudinally first.

When it is impossible for the host vehicle, which is a following vehicle, to collide with a front vehicle when the leading vehicle is fully braked longitudinally, the collision avoidance control unit 290 performs the same longitudinal control as the leading vehicle on the host vehicle that is a following vehicle.

The present disclosure allows a following vehicle to perform transverse control or longitudinal control independently from a leading vehicle according to a situation (whether the following vehicle collides with a front vehicle when the leading vehicle is fully braked longitudinally or whether collision may be avoided) of the leading vehicle in an emergent situation without simply following a control command received from the leading vehicle. Accordingly, the present disclosure may allow the following vehicle to flexibly cope with an emergent situation while a transverse condition varies in real time.

Figure 6:
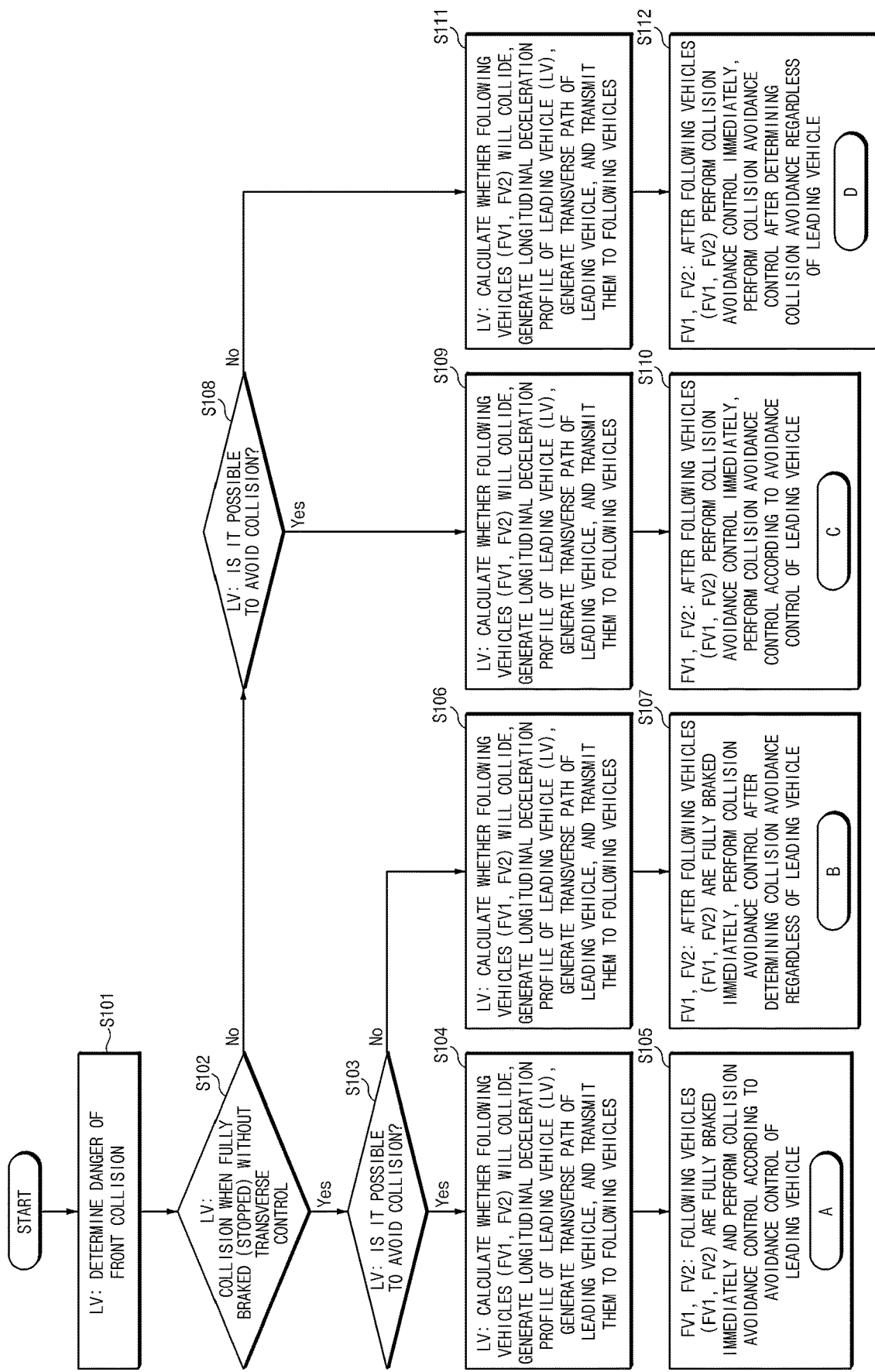
FIG. 6 is a flowchart illustrating a method for controlling platooning for active collision avoidance control of a following vehicle according to an embodiment of the present disclosure.

Hereinafter, a method for controlling platooning for an active collision avoidance control of a following vehicle according to an embodiment of the present disclosure is described below with reference to FIG. 6. FIG. 6 is a flowchart illustrating a method for controlling platooning for an active collision avoidance control of a following vehicle according to an embodiment of the present disclosure. As illustrated in FIG. 1, it is assumed that a leading vehicle LV travels on the foremost side of a platoon. It is also assumed that following vehicles FV1 and FV2 follow the leading vehicle LV.

Referring to FIG. 6, a platooning control apparatus 200 of a leading vehicle in a platoon determines whether there is a danger of front collision (S101). Then, the platooning control apparatus 200 of the leading vehicle may determine whether the leading vehicle will collide with a front obstacle (a preceding vehicle or a front vehicle) based on information acquired from a detector such as a radar device or a camera.

Thereafter, the platooning control apparatus 200 of the leading vehicle determines whether the leading vehicle will collide with a front obstacle when being fully braked (stopped) without using transverse control (S102). In other words, the platooning control apparatus 200 of the leading vehicle determines whether the leading vehicle collides with a front vehicle when the vehicle is stopped by performing full braking immediately after it is determined that there is a danger of front collision.

When it is determined that the leading vehicle may collide with a front obstacle when the leading vehicle is fully braked, the platooning control apparatus 200 of the leading vehicle determines whether collision may be avoided (S103). In other words, the platooning control apparatus 200 determines whether collision of the host vehicle may be avoided through transverse control of the vehicle in consideration of the speed of the host vehicle, the speeds of front and rear vehicles on the current lane and the lateral lanes, vehicle-to-vehicle distances, and lateral lane spaces through side radar devices.

Accordingly, when it is determined that collision may be avoided, the platooning control apparatus 200 of the leading vehicle calculates whether the following vehicles FV1 and FV2 will collide, generates a longitudinal deceleration profile of the leading vehicle (current host vehicle), generates a transverse path of the leading vehicle (current host vehicle) for avoidance of collision, and transmits them to the following vehicles FV1 and FV2 (S104).

Subsequently, the platooning control apparatuses 200 of the following vehicles FV1 and FV2 perform full braking as soon as receiving information on whether the following vehicles will collide from the leading vehicle LV. The platooning control apparatuses 200 of the following vehicles FV1 and FV2 then perform collision avoidance control of the host vehicle (following vehicle) according to a collision avoidance control direction of the leading vehicle (S105) (A). This is described further below with reference to FIG. 7.

When it is determined in operation S103 that collision cannot be avoided, the platooning control apparatus 200 of the leading vehicle calculates whether the following vehicles FV1 and FV2 will collide, generates a longitudinal deceleration profile of the leading vehicle (current host vehicle), generates a transverse path of the leading vehicle (current host vehicle) for avoidance of collision, and transmits them to the following vehicles FV1 and FV2 (S106).

Subsequently, because the platooning control apparatuses 200 of the following vehicles FV1 and FV2 perform full braking as soon as the information is received on whether the following vehicles will collide from the leading vehicle LV and since the leading vehicle LV does not perform collision avoidance control, the platooning control apparatuses 200 of the following vehicles FV1 and FV2 determine the avoidance of collision regardless of the avoidance control of the leading vehicle to perform collision avoidance control (S107) (B). This is described further below with reference to FIG. 8.

If it is determined in operation S102 that front collision will not occur when the leading vehicle is fully braked, the platooning control apparatus 200 of the leading vehicle determines whether collision may be avoided (S108).

Accordingly, when it is determined that collision may be avoided, the platooning control apparatus 200 of the leading vehicle calculates whether the following vehicles FV1 and FV2 will collide, generates a longitudinal deceleration profile of the leading vehicle (current host vehicle), generates a transverse path of the leading vehicle (current host vehicle) for avoidance of collision, and transmits them to the following vehicles FV1 and FV2 (S109).

Subsequently, the platooning control apparatuses 200 of the following vehicles FV1 and FV2 perform the same longitudinal control as the leading vehicle LV as soon as the information is received on whether the following vehicles will collide from the leading vehicle LV (for example, deceleration). The platooning control apparatuses 200 of the following vehicles FV1 and FV2 then perform collision avoidance control of the host vehicle (following vehicle) according to a collision avoidance control direction of the leading vehicle (S110) (C). This is described further below with reference to FIG. 9.

When it is determined in operation S108 that collision cannot be avoided, the platooning control apparatus 200 of the leading vehicle calculates whether the following vehicles FV1 and FV2 will collide, generates a longitudinal deceleration profile of the leading vehicle (current host vehicle), generates a transverse path of the leading vehicle (current host vehicle) for avoidance of collision, and transmits them to the following vehicles FV1 and FV2 (S111).

Subsequently, because the platooning control apparatuses 200 of the following vehicles FV1 and FV2 perform the same longitudinal control as the leading vehicle LV as soon as receiving information on whether the following vehicles will collide from the leading vehicle LV (for example, deceleration) and the leading vehicle LV does not perform collision avoidance control, the platooning control apparatuses 200 determine avoidance of collision regardless of avoidance control of the leading vehicle to perform collision avoidance control. This is described further below with reference to FIG. 10.

Figure 7:
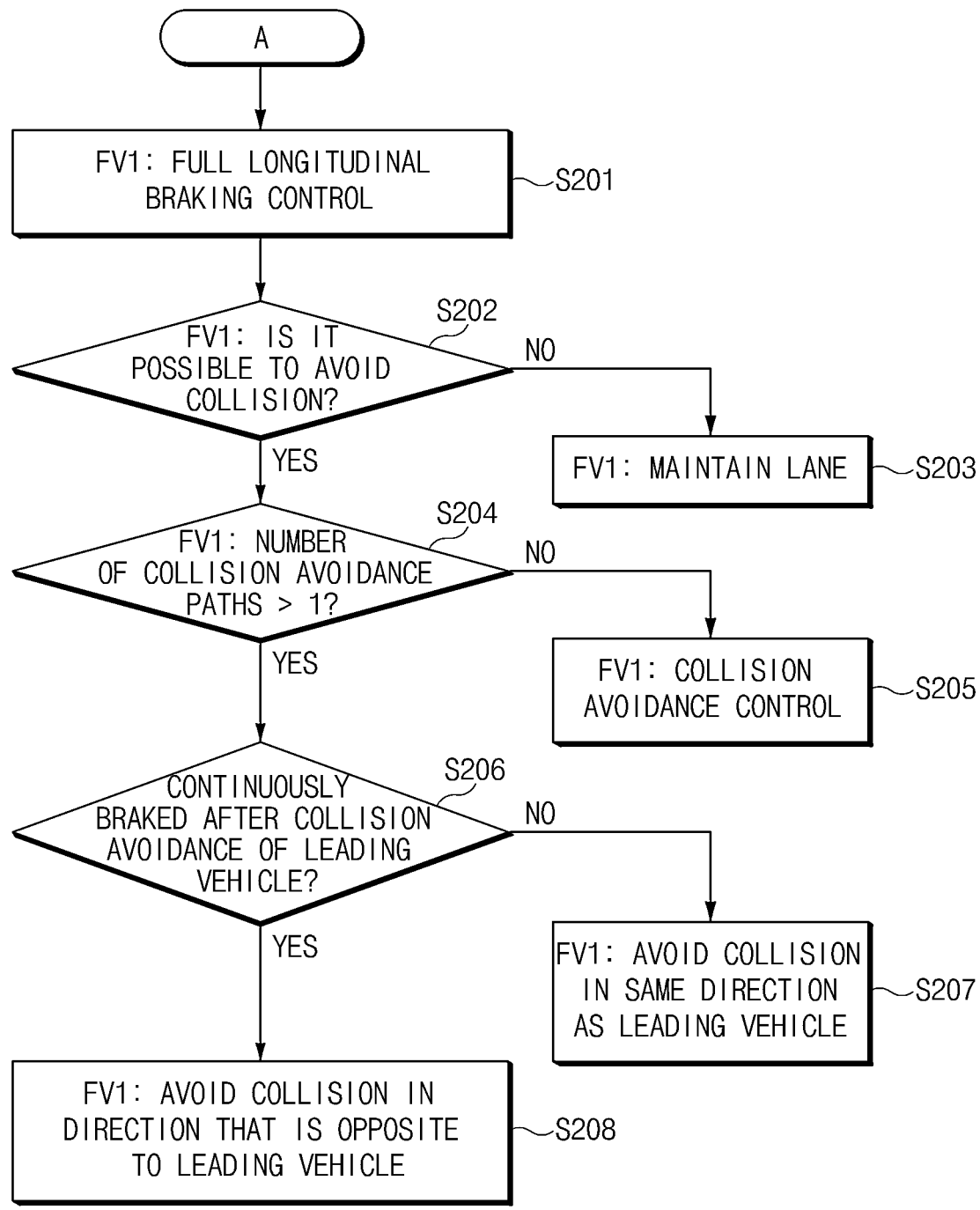
FIG. 7 is a flowchart illustrating a method for controlling platooning of a following vehicle when the following vehicle may collide with a front vehicle and the collision may be avoided when a leading vehicle is fully braked longitudinally according to an embodiment of the present disclosure.

Hereinafter, a method for controlling platooning of a following vehicle when the following vehicle may collide with a front vehicle and the collision may be avoided when a leading vehicle is fully braked longitudinally according to an embodiment of the present disclosure is described further with reference to FIG. 7. FIG. 7 is a flowchart illustrating a method for controlling platooning of a following vehicle when the following vehicle may collide with a front vehicle and the collision may be avoided when a leading vehicle is fully braked longitudinally according to an embodiment of the present disclosure (A of S105 in FIG. 6).

Referring to FIG. 7, the platooning control apparatuses 200 of following vehicle FV1 performs longitudinal full braking control as soon as the information is received on whether the following vehicle may collide from a leading vehicle LV (S201).

The platooning control apparatuses 200 of the following vehicle FV1 determines whether the following vehicle FV1 may avoid collision with a front obstacle or a front vehicle (S202). When it is impossible to avoid collision of the following vehicle FV1, the platooning control apparatuses 200 maintain the vehicles FV1 in the same lane because the collision cannot be avoided (S203).

When the collision of the following vehicles may be avoided, the platooning control apparatuses 200 generates a collision avoidance path and determines whether the number of collision avoidance paths (for example, left and right lanes) is more than 1 (S204). Additionally, if the number of the collision avoidance paths is 1, the platooning control apparatuses 200 changes a lane to the collision avoidance path to perform collision avoidance control (S205). If the number of the collision avoidance paths is 2, the platooning control apparatuses 200 determine whether the leading vehicle is continuously braked after the collision avoidance control (S206). Then, the platooning control apparatuses 200 of the following vehicles FV1 may determine whether the leading vehicle is braked after the avoidance control of the leading vehicle from the deceleration profile received from the leading vehicle.

Accordingly, if the leading vehicle is continuously braked after the collision avoidance control, in other words, if the leading vehicle is continuously braked even after the lane of the leading vehicle has been changed for avoidance of collision, it indicates that another obstacle is present in front of the changed lane. Thus, the platooning control apparatuses 200 of the following vehicle FV1 performs collision avoidance control to a direction that is opposite to the leading vehicle (S208).

If the leading vehicle is not continuously braked after the collision avoidance control, it indicates that an obstacle is not present in front of a lane to which the leading vehicle changed lane for avoidance of collision. Thus, the platooning control apparatuses 200 of the following vehicle FV1 controls the collision avoidance to a direction that is the same as the leading vehicle (S207). Hereinafter, the step s201~s208 may be equally applied to the following vehicle FV2 as well as the following vehicle FV1.

Figure 8:
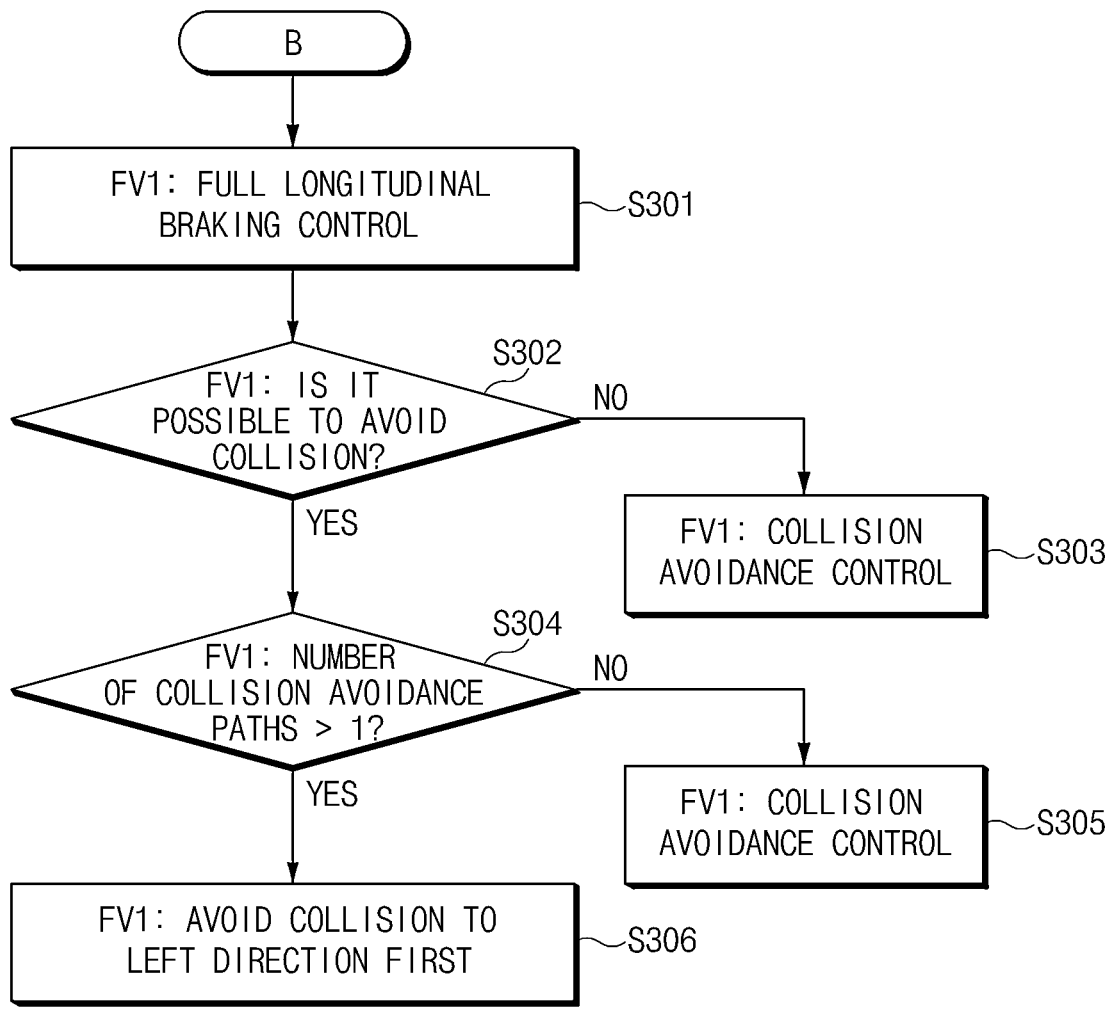
FIG. 8 is a flowchart illustrating a method for controlling platooning of a following vehicle when the following vehicle may collide with a front vehicle and the collision cannot be avoided when a leading vehicle is fully braked longitudinally according to an embodiment of the present disclosure.

Hereinafter, a method for controlling platooning of a following vehicle when the following vehicle may collide with a front vehicle and the collision cannot be avoided when a leading vehicle is fully braked longitudinally according to an embodiment of the present disclosure is described further below with reference to FIG. 8. FIG. 8 is a flowchart illustrating a method for controlling platooning of a following vehicle when the following vehicle may collide with a front vehicle and the collision cannot be avoided when a leading vehicle is fully braked longitudinally according to an embodiment of the present disclosure (B of S107 in FIG. 6).

The platooning control apparatuses 200 of the following vehicle FV1 performs longitudinal full braking control as soon as receiving information on whether the following vehicle may collide from a leading vehicle LV (S301).

The platooning control apparatuses 200 of the following vehicle FV1 determines whether the following vehicles FV1 may avoid collision with a front obstacle or a front vehicle (S302). When it is impossible to avoid collision of the following vehicles FV1, the platooning control apparatuses 200 maintain the vehicle FV1 in the same lane because the collision cannot be avoided (S303).

When the collision of the following vehicles may be avoided, the platooning control apparatuses 200 generate a collision avoidance path and determine whether the number of collision avoidance paths (for example, left and right lanes) is more than 1 (S304). If the number of the collision avoidance paths is 1, the platooning control apparatuses 200 change a lane to the collision avoidance path to perform collision avoidance control (S305). If the number of collision avoidance paths is 2, the left one of the two avoidance paths is a passing lane. Thus, collision avoidance control to the left direction is performed (S306). Since the collision avoidance control of the leading vehicle is not performed, the avoidance of the following vehicle is independently controlled regardless of the avoidance of the leading vehicle. In other words, the following vehicle is independently controlled regardless of whether the leading vehicle is continuously braked after the avoidance of the collision of the leading vehicle. Hereinafter, the step s301~s306 may be equally applied to the following vehicle FV2 as well as the following vehicle FV1.

Figure 9:
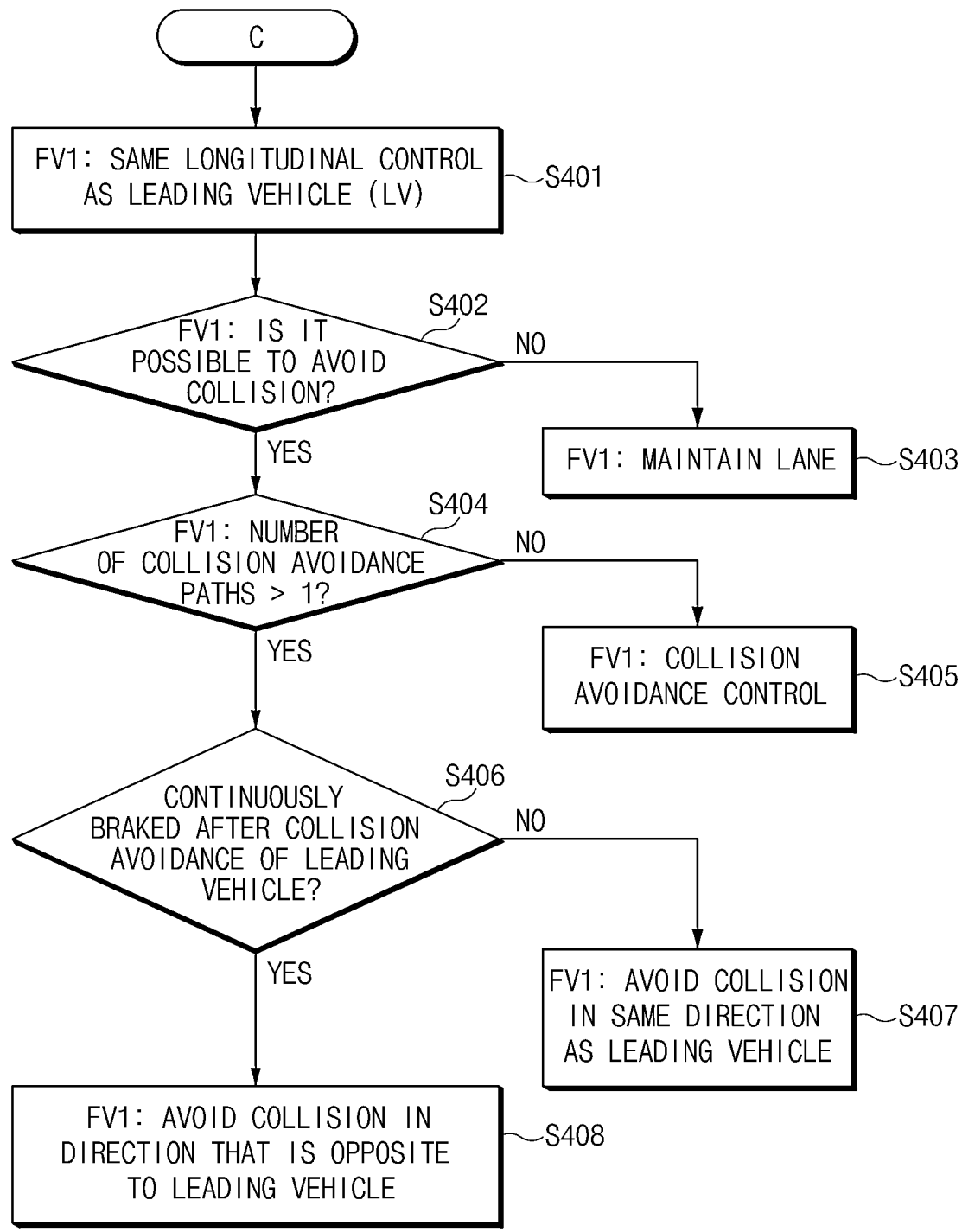
FIG. 9 is a flowchart illustrating a method for controlling platooning of a following vehicle when the following vehicle cannot collide with a front vehicle and the collision may be avoided when a leading vehicle is fully braked longitudinally according to an embodiment of the present disclosure.

Hereinafter, a method for controlling platooning of a following vehicle when the following vehicle cannot collide with a front vehicle and the collision may be avoided when a leading vehicle is fully braked longitudinally according to an embodiment of the present disclosure is described further below with reference to FIG. 9. FIG. 9 is a flowchart illustrating a method for controlling platooning of a following vehicle when the following vehicle cannot collide with a front vehicle and the collision may be avoided when a leading vehicle is fully braked longitudinally according to an embodiment of the present disclosure (C of S110 in FIG. 6).

Referring to FIG. 9, the platooning control apparatuses 200 of following vehicles FV1 performs the same longitudinal control as the leading vehicle as soon as receiving information on whether the following vehicle may collide from a leading vehicle LV (S401). In one example, when the leading vehicle decelerates, the leading vehicle also decelerates to the same speed.

The platooning control apparatuses 200 of the following vehicle FV1 determines whether the following vehicle FV1 may avoid collision with a front obstacle or a front vehicle (S402). When it is impossible to avoid collision of the following vehicle FV1, the platooning control apparatuses 200 maintain the following vehicle FV1 in the same lane because the collision cannot be avoided (S403).

When the collision of the following vehicles may be avoided, the platooning control apparatuses 200 generate a collision avoidance path and determine whether the number of collision avoidance paths (for example, left and right lanes) is more than 1 (S404). If the number of the collision avoidance paths is 1, the platooning control apparatuses 200 change a lane to the collision avoidance path to perform collision avoidance control (S405). If the number of the collision avoidance paths is 2, the platooning control apparatuses 200 determine whether the leading vehicle is continuously braked after the collision avoidance control (S406). Then, the platooning control apparatuses 200 of the following vehicle FV1 may determine whether the leading vehicle is braked after the avoidance control of the leading vehicle from the deceleration profile received from the leading vehicle.

Accordingly, if the leading vehicle is continuously braked after the collision avoidance control, i.e., if the leading vehicle is continuously braked even after the lane of the leading vehicle has been changed for avoidance of collision, it indicates that another obstacle is present in front of the changed lane. Thus, the platooning control apparatuses 200 of the following vehicle FV1 performs collision avoidance control to a direction that is opposite to the leading vehicle (S408).

If the leading vehicle is not continuously braked after the collision avoidance control, it indicates that an obstacle is not present in front of a lane to which the leading vehicle changed lane for avoidance of collision. Thus, the platooning control apparatuses 200 of the following vehicle FV1 controls the collision avoidance to a direction that is the same as the leading vehicle (S407). Hereinafter, the step s401~s408 may be equally applied to the following vehicle FV2 as well as the following vehicle FV1.

Figure 10:
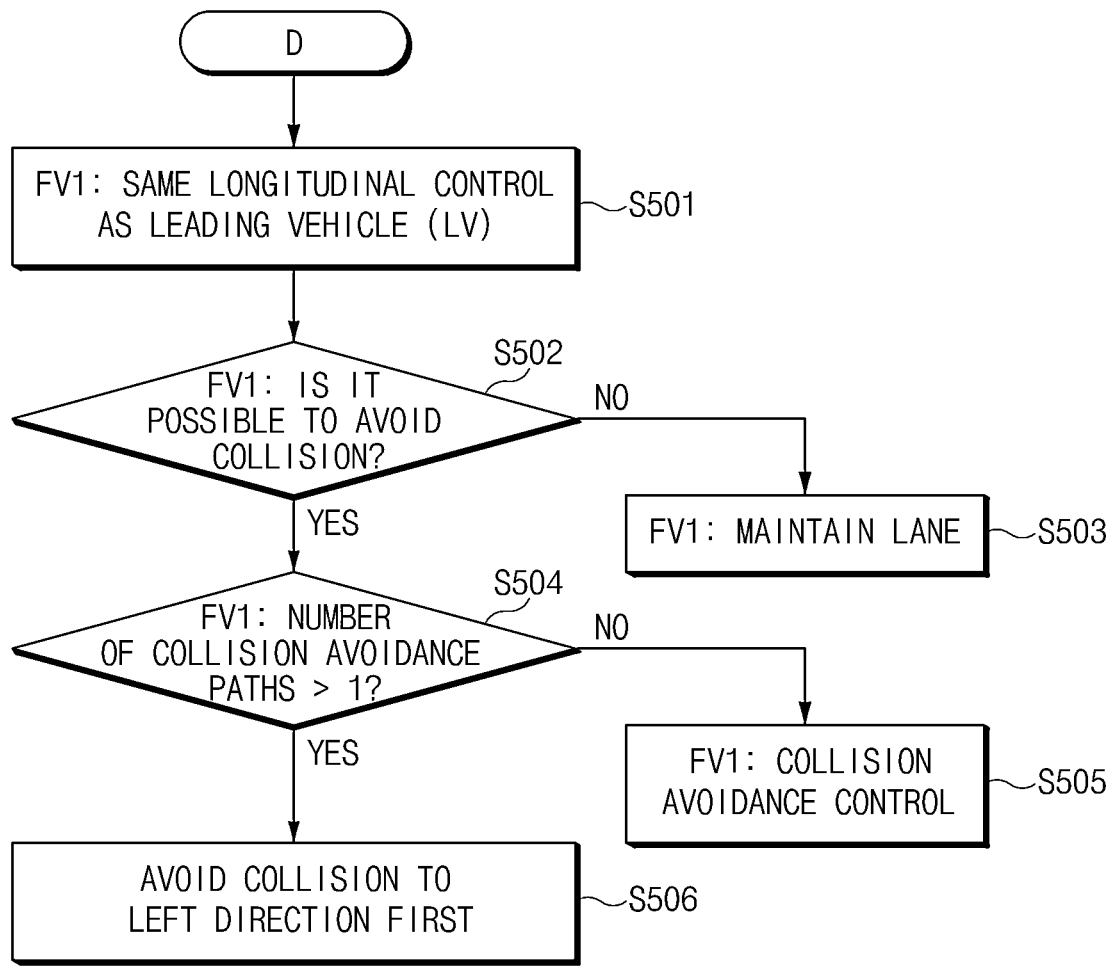
FIG. 10 is a flowchart illustrating a method for controlling platooning of a following vehicle when the following vehicle cannot collide with a front vehicle and the collision cannot be avoided when a leading vehicle is fully braked longitudinally according to an embodiment of the present disclosure.

Hereinafter, a method for controlling platooning of a following vehicle when the following vehicle cannot collide with a front vehicle and the collision cannot be avoided when a leading vehicle is fully braked longitudinally according to an embodiment of the present disclosure is further described with reference to FIG. 10. FIG. 10 is a flowchart illustrating a method for controlling platooning of a following vehicle when the following vehicle cannot collide with a front vehicle and the collision cannot be avoided when a leading vehicle is fully braked longitudinally according to an embodiment of the present disclosure (D of S112 in FIG. 6).

Referring to FIG. 10, the platooning control apparatuses 200 of following vehicle FV1 performs the same longitudinal control as the leading vehicle as soon as receiving information on whether the following vehicle may collide from a leading vehicle LV (S501). In one example, when the leading vehicle decelerates, the leading vehicle also decelerates to the same speed.

The platooning control apparatuses 200 of the following vehicle FV1 determine whether the following vehicle FV1 may avoid collision with a front obstacle or a front vehicle (S502). When it is impossible to avoid collision of the following vehicle FV1, the platooning control apparatuses 200 maintain the following vehicle FV1 in the same lane because the collision cannot be avoided (S503).

When the collision of the following vehicles may be avoided, the platooning control apparatuses 200 generates a collision avoidance path and determines whether the number of collision avoidance paths (for example, left and right lanes) is more than 1 (S504). If the number of the collision avoidance paths is 1, the platooning control apparatuses 200 change a lane to the collision avoidance path to perform collision avoidance control (S505). If the number of collision avoidance paths is 2, the left one of the two avoidance paths is a passing lane. Thus, collision avoidance control to the left direction is performed (S506). Hereinafter, the step s501~s506 may be equally applied to the following vehicle FV2 as well as the following vehicle FV1.

Then, because this is a case in which the collision avoidance control of the leading vehicle is not performed, the avoidance of the following vehicle is independently controlled regardless of the avoidance of the leading vehicle. In other words, the avoidance of the following vehicle is independently controlled regardless of whether the leading vehicle is continuously braked after the avoidance of the collision of the leading vehicle.

In this way, the present disclosure may allow a following vehicle to perform active avoidance control independently in consideration of the avoidance control of the leading vehicle or regardless of the avoidance control of the leading vehicle according to whether the host vehicle collides a front vehicle and whether longitudinal collision may be avoided if it is determined by the leading vehicle in the platooning whether the leading vehicle collides with a front obstacle. In other words, the leading vehicle may perform longitudinal and transverse control according to a situation in which longitudinal collision may be avoided. The following vehicle may follow a leading vehicle or may perform transverse control according to situations independently based on the information received from the leading vehicle. Accordingly, safe platooning may be achieved by preventing wrong control in consideration of characteristics in which a transverse condition varies in real time.

Figure 11:
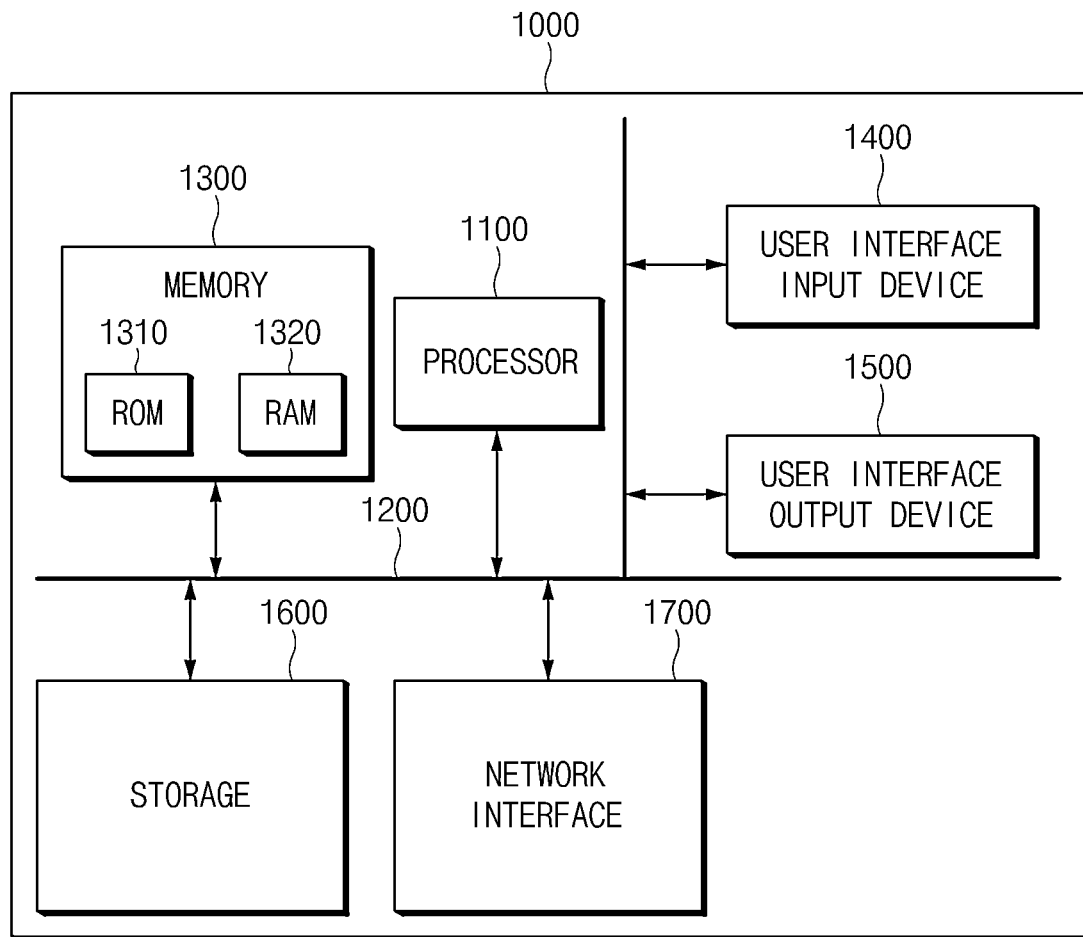
FIG. 11 is a diagram of a computer system, to which the method for controlling active collision avoidance of a following vehicle according to an embodiment of the present disclosure is applied.

FIG. 11 is a diagram of a computer system, to which the method for controlling active collision avoidance of a following vehicle according to an embodiment of the present disclosure is applied. Referring to FIG. 11, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random-access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM.

The storage medium is coupled to the processor 1100. The processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another example, the processor and the storage medium may reside in the user terminal as an individual component.

The technology may actively perform collision avoidance control by allowing a following vehicle to perform independent transverse control according to whether a host vehicle will collide with a front vehicle and whether it is possible to avoid longitudinal collision when a leading vehicle is fully braked longitudinally when an emergent situation occurs during platooning.

The above description contains several embodiments of the technical spirit of the present disclosure. The present disclosure may be variously modified by those of ordinary skill in the art to which the present disclosure pertains without departing from the essential features of the present disclosure.

Therefore, the disclosed embodiments of the present disclosure do not limit the technical spirit of the present disclosure but are illustrative. The scope of the technical spirit of the present disclosure is not limited by the embodiments of the present disclosure. The scope of the present disclosure should be construed by the claims. It will be understood that all the technical spirits within the equivalent range fall within the scope of the present disclosure.

What is claimed is:

1. A platooning control system comprising:
a first platooning control apparatus including a first processor, the first platooning control apparatus located in a host vehicle, wherein the host vehicle is a leading vehicle in a platoon during platooning, the first platooning control apparatus configured to
determine whether it is possible for the host vehicle to collide with a front vehicle when the host vehicle is fully braked and whether it is possible to avoid a collision between the host vehicle and the front vehicle when it is determined that the collision between the host vehicle and the front vehicle will occur when the host vehicle is fully braked,
calculate a longitudinal deceleration profile of the host vehicle, a transverse path of the host vehicle, and whether a collision with following vehicles that follow the host vehicle in the platoon is possible, and
transmit the calculation results and the determination results to the following vehicles; and
a second platooning control apparatus including a second processor, the second platooning control apparatus located in a following vehicle in the platoon, and configured to
determine whether it is possible for the following vehicle to avoid the collision between the host vehicle and the front vehicle according to whether it is possible for the host vehicle to collide with the front vehicle when the host vehicle is fully braked, determine whether it is possible for the following vehicle to avoid the collision with following vehicles when it is determined that the collision with following vehicles will occur when the host vehicle is fully braked, and control the following vehicle to follow the host vehicle or perform collision avoidance control separately from the host vehicle.

\* \* \* \* \*